United States Patent [19]

Brown et al.

[11] 4,103,859
[45] Aug. 1, 1978

[54] LINEAR SUPPORT APPARATUS

[75] Inventors: Jerald L. Brown, Oklahoma City; John J. Shelton, Tuttle, both of Okla.

[73] Assignee: Fife Corporation, Oklahoma City, Okla.

[21] Appl. No.: 751,743

[22] Filed: Dec. 17, 1976

Related U.S. Application Data

[63] Continuation of Ser. No. 606,127, Aug. 20, 1975, abandoned.

[51] Int. Cl.$^2$ ............................................. F16M 13/00
[52] U.S. Cl. .................................................... 248/425
[58] Field of Search ....................... 248/396, 424, 425; 108/137, 143; 226/21, 22, 23

[56] References Cited

U.S. PATENT DOCUMENTS

| | | | |
|---|---|---|---|
| 2,797,091 | 6/1957 | Fife | 226/21 |
| 3,288,421 | 11/1966 | Peterson | 248/396 |
| 3,419,238 | 12/1968 | Flory | 248/163 |
| 3,577,659 | 5/1971 | Kail | 248/396 |
| 3,581,963 | 6/1971 | Rule | 226/21 |
| 3,724,732 | 4/1973 | Bonner | 226/21 |

Primary Examiner—Robert A. Hafer
Attorney, Agent, or Firm—Dunlap, Codding & McCarthy

[57] ABSTRACT

An improved apparatus for supporting a frame for pivotation of the frame relative to a selected axis of pivotation. A plurality of connectors are attached to the frame at pivot support points on the frame, and the connectors are supported by a plurality of bearing posts that are arranged in a determined geometric relationship such that each connector is movable on its respective bearing post along an axis of travel, the axis of travel for each of the connectors passing through a common travel axis convergence point. The determined geometric relationship further directs the frame to have a positional reference mode in which all of the pivot support points are positioned on the circumference of a reference circle that intersects the axis of pivotation at an initial pivotation center, the initial pivotation center being located at one end of a reference diameter of the reference circle, and the travel axis convergence point being located at the other end of the reference diameter.

11 Claims, 7 Drawing Figures

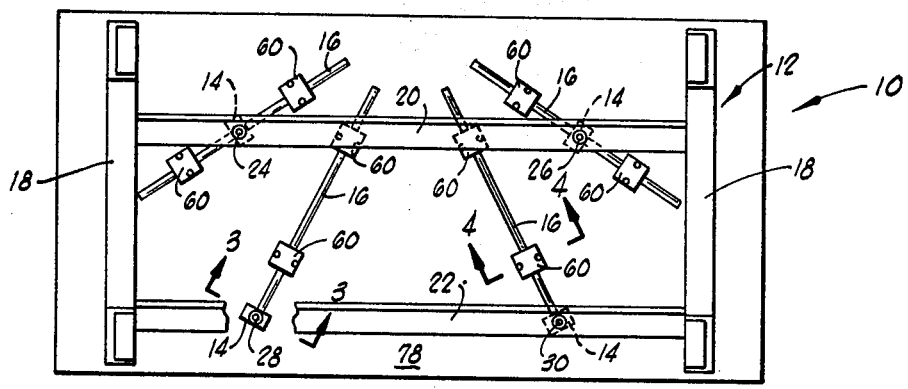

LINEAR SUPPORT APPARATUS

RELATED APPLICATIONS

This is a continuation application to the application entitled "Linear Support Apparatus", Ser. No. 606,127, filed Aug. 20, 1975, now abandoned.

BACKGROUND OF THE INVENTION

1. Field of the Invention

This invention relates to an improved support for pivoting a frame about an axis of pivotation by the use of multiple linear bearing surfaces.

2. Description of the Prior Art

There are numerous schemes and designs for supporting pivoting structures, ranging from simple ball or journal bearings and upward in complexity. Where it is possible to attach support members to a pivoting member at any of many support points, no problem of weight distribution arises. However, major problems arise where there are limited support points as for instance where rolling surfaces are involved, or where the weight for a support member requires that support devices be attached at remote points.

An example of such problems can be found in applications where webbed material is handled over a plurality of rollers, such as for a paper web in a printing operation, or in the manufacture and processing of textiles and carpets. Often it is necessary to pass webs over and through a number of rollers, threading, turning, wrapping and in many other ways contacting rollers that often have large cantilevered forces upon their end bearing supports. Furthermore, rollers used in such applications often must be supported in a variety of positional modes, thereby requiring vertical, overhead or other unusual support structure and specially positioned bearing surfaces.

In utilizing rollers of the kind mentioned, it is sometimes necessary that a web be pivoted about a selected axis so as to correct the web's direction of travel due to deviations in the web's path of travel. An apparatus for supporting and correcting web travel deviations utilizing two linear support positions was taught in U.S. Pat. No. 2,797,091, issued to I. L. Fife. The apparatus of that patent has found many commercial applications, but its uses have been restricted because of the limited bearing surface available.

Others have sought to complement or extend the utilization range of linear bearings for pivoting structure by introducing curvilinear support posts. The obvious advantage of curved posts has been the ability to pivot a frame or a structural member while maintaining better weight and force distribution. Of course, the utilization of curvilinear bearing posts presents the problem of bearing attachment to the posts where large bearings are utilized, limiting the dimensions that can be used for such bearings. That is, a large bearing block requires precision matched curved surfaces for the block and the post, or a restriction to the utilization of very gradually curving surfaces. Either of these restrictions severely limits the radius of turn available for the pivoting structure. Another problem presented by the use of curvilinear bearing posts is that control mechanisms must be especially adapted for the curvilinear design.

While the discussion to this point has largely dealt with supporting pivoting rollers, the problem solved by the present invention by no means is so restricted. There is a need in numerous instances for the support of a frame or structural member on multiple linear bearings that permit good pivoting characteristics while providing even weight and force distribution on the bearings. It is to that requirement that the present invention is directed.

SUMMARY OF THE INVENTION

An object of the present invention is to provide an apparatus that utilizes linear bearing surfaces to support a pivoting frame.

Another object of the present invention is to provide a pivoting support apparatus capable of pivoting a frame about a selected axis of pivotation while utilizing multiple linear bearing surfaces.

Another object of the present invention is to provide a pivoting support apparatus utilizing linear bearing surfaces operable in any selected plane of pivotation.

Another object of the present invention is to provide a pivoting support apparatus capable of utilizing rigid, linear turning and control mechanisms to effect controlled pivoting.

Another object of the present invention is to provide a linear bearing pivotation apparatus utilizing common elements that require a minimum in manufacturing costs and upkeep.

Other objects, features and advantages of the invention will be apparent from the following detailed description when read in conjunction with the accompanying drawings, which illustrate the preferred embodiment of the invention, and the appended claims.

BRIEF DESCRIPTION OF THE DRAWINGS

FIG. 1 is a side view of one embodiment of a linear support apparatus constructed in accordance with the present invention.

FIG. 2 is a top plan view of the linear support apparatus shown in FIG. 1.

FIG. 3 is a cross sectional view of one of the pivoting connectors as viewed at 3—3 in FIG. 2.

FIG. 4 is a cross sectional view of one of a bearing block that slidingly holds a bearing post as viewed at 4—4 in FIG. 2.

FIG. 5 is a diagram of the apparatus layout of the present invention illustrating the geometric relationship required of the spatial positioning of the components of the present invention.

DESCRIPTION OF THE PREFERRED EMBODIMENT

Figures 6A, 6B:
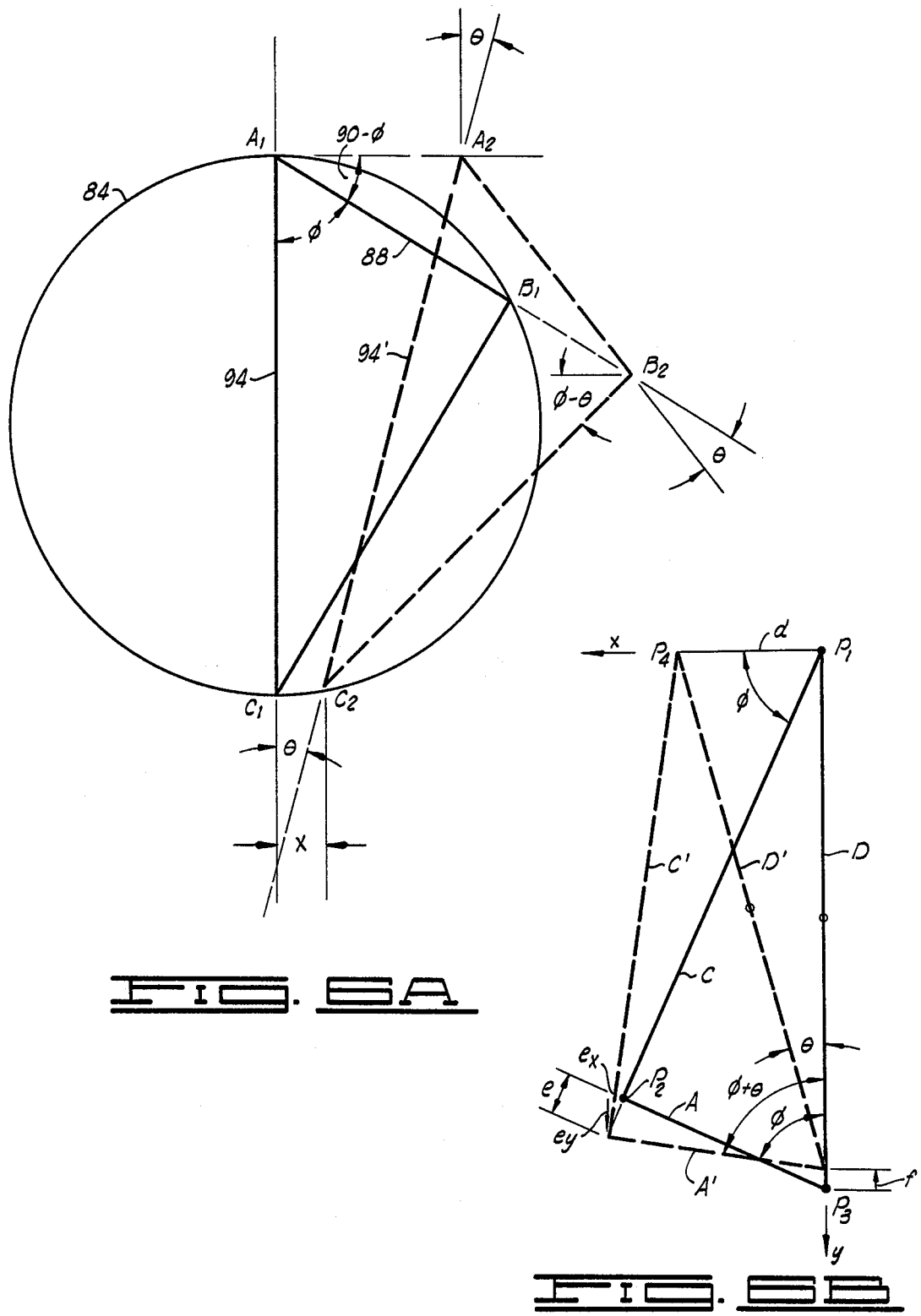
FIGS. 6A and 6B are diagrammatical representations of the movement of the support points of the present invention.

Referring to the drawings, FIG. 1 shows a side elevational view of a linear support apparatus constructed in accordance with the present invention and designated by the general reference numeral 10. A frame 12 is connected to several pivoting connectors 14 that are each securedly connected to a respective bearing post 16, as can also be viewed by referring to FIG. 2 which shows a top plan view of the linear support apparatus 10.

The frame 12 is comprised of two tubular end members 18 that are attached to and spaced apart by a cross member 20 and a cross member 22. The cross members 20, 22 are connected to the pivoting connectors 14 at selected pivot support points 24 and 26 on the cross member 20, and at selected pivot support points 28 and 30 on the cross member 22.

All of the pivoting connectors 14 are identical in construction detail, and a cross section of one of the pivoting connectors 14 as taken at 3—3 in FIG. 2 is shown in FIG. 3. The pivoting connector 14 shown in FIG. 3 has a support block 15 having a longitudinal bore 32 and a slot 34 cut from a surface 36 and extending to the bore 32. An aperture 38 extends from an edge 40 of the support block 15 through a portion thereof to communicate with the slot 34. A threaded aperture 42 serves as an extension of the aperture 38 on the opposite side of the slot 34. A bolt 44 is disposed to extend through the aperture 38 to threadingly engage the aperture 42. The bearing post 16 is disposed to extend through the bore 32, and the bolt 44 is tightened in the threaded aperture 42 to cause the support block 15 to securely grip the bearing post 16.

Extending from the top surface 48 of the support block 15 is a threaded aperture 50 that serves as the attachment between the frame 12 and the bearing post 16. Referring to the cross member 22, at the point 28 thereon there is located an aperture 52 which has disposed therein a conventional bearing sleeve bushing 54. A bolt connector 56 passes through the sleeve bushing 54 and threadingly engages the aperture 50 in the support block 15, the connector 56 thereby serving to pivotally connect the cross member 22 and the support block 15 of the pivoting connector 14. The support block 15 is free to pivot via the bolt connector 56 in the sleeve bushing 54 relative to the transverse cross member 22.

Turning now to the bearing posts 16, it will be seen by referring to FIGS. 1 and 2 that the bearing posts 16 are slidingly held in spatial relationship by a number of bearing blocks 60. FIG. 4 shows a view of one of these bearing blocks 60 as viewed at 4—4 of FIG. 2. Each of the bearing blocks 60 has a longitudinal bore 62 into which is pressed a bearing bushing 64 which will be described in more detail below. The bushing 64 slidingly engages one of the bearing posts 16.

Through the surface 68 of the bearing block 60 extends a pair of apertures 70 that align with a pair of threaded apertures 74 that extend from a surface 76 into a bearing plate or support platform 78. A pair of partially threaded bolts 80 pass through the apertures 70 and threadingly engage the apertures 74 to securedly hold the bearing block 60 to the bearing plate 78.

Referring once more to FIG. 2, depicted therein are four of the bearing posts 16 that are held in fixed spatial relationship to the frame 12 by an equal number of the pivoting connectors 14. Two of the bearing blocks 60 slidingly hold each of the bearing posts 16 via the bearing bushings 64, as described above. Each of the bearing blocks 60 slidingly supports its respective bearing post 16 and in turn is secured to the bearing plate 78 by its respective bolts 80. At each of the pivot support points 24, 26, 28 and 30 of the transverse cross members 20 and 22 there is connected a pivoting connector 14 held in pivotal relationship to its respective cross member by its bolt connector 56. Each of the pivoting connectors 14 is securedly attached to its respective bearing post 16, and each of the bearing posts 16, being slidingly supported by a pair of bearing blocks 60, is free to reciprocatingly slide along its longitudinal axis. An overview then of the support apparatus 10 would see that the frame 12 is supported on the pivoting connectors 14, the bearing posts 16, and the bearing blocks 60, the latter blocks being attached to plate 78. Of course, the bearing plate 78 could as well be any support platform selected for the purpose of holding the apparatus of the present invention.

At this point, it will be well to add a brief discussion of the sliding relationship of the bearing posts 16 and the bearing bushings 64 disposed in the bearing blocks 60. Each bearing post 16 is a polished bearing rod receivable in the bore of a bearing bushing 64. The bearing bushings 64 may be any of a number of bearing surfaces suitable for sliding engagement with the bearing posts 16. As depicted in FIG. 4, the bearing bushing 64 comprises an arrangement of spaced apart ball bearings. This type of bearing bushing is available under the trademark of Super Ball Bushings and are manufactured by Thomson Industries, Inc., Manhasset, N.Y. The present invention is not limited by the choice of bearing surfaces, and it will be recognized that a number of combinations of bearing surfaces could be used to effect the linear movement of the bearing posts 16 relative to the bearing blocks 60.

It will be apparent that the bearing posts 16 could as well be fixed relative to the support platform or plate 78, the bearing bushings 64 disposed within the pivoting connectors 14, and the bearing bushings 64 made to slide on the fixed bearing posts.

To this point in the disclosure of the present invention the discussion has been concerned with a description of the preferred components to construct the linear support apparatus 10. It will now be necessary for disclosure purposes herein to discuss the design criteria for the geometric arrangement of the above-described components. It will not be apparent without further explanation that the bearing posts 16 must be placed in a special spatial relationship in order to make the linear support apparatus 10 operative. This will require a discussion of the diagrams shown in FIGS. 5, 6A and 6B.

Referring to FIG. 5, a discussion now will be offered of the principle of the present invention, leaving off for the time being any further discussion of the physical apparatus thereof. A block rectangle 82 depicts the frame 12 in a neutral or unpivoted position, hereinafter referred to as the reference position of the frame 12. As was discussed above, the selected pivot support points 24 and 26 represent points on the cross member 20, and the selected pivot support points 28 and 30 are points on the cross member 22. These points have been arbitrarily selected to reflect desirable pivot support points for the frame 12, and it should be understood that the selection of these pivot support points is not limiting to the present invention, so long as they retain the special geometric relationship hereinafter described. In the embodiment shown in FIGS. 1 through 4, the cross members 20 and 22 are generally coplanar, and it is therefore apparent that the selected pivot support points 24, 26, 28 and 30 are also coplanar. The selection of the location of these pivot support points is made in the following manner.

First, it is determined by the particular requirement of the application at hand that the frame 12 is to be pivoted about a selected axis of pivotation. In FIG. 5, the rectangle 82 represents the frame 12, and for purposes of illustration, it is arbitrarily decided to pivot the rectangle 82 about an axis of pivotation that is perpendicular to the drawing and which intersects the drawing at point A. That is, the rectangle 82 is coplanar with the sheet of paper that contains FIG. 5, and the rectangle 82 will be pivoted in the plane of the drawing about the axis of pivotation passing through point A. Point A will sometimes hereinbelow be referred to as the initial pivotation center. A reference circle 84, the size of which is arbitrarily established, is drawn over the rectangle 82 so that its circumference passes through the initial pivotation center A. The pivot support points 24, 26, 28, 30 are then selected arbitrarily along the portions of the circumference of the reference circle 84 that contain loci that are contained within the area of the rectangle 82. Of course, the size of the reference circle 84 and the selection of the location of the selected pivot support points are determined by the physical requirements of the frame to be supported. For purposes of discussion, the pivot support points 24, 26, 28 and 30 have been arbitrarily located as drawn in FIG. 5, and it will be understood that the number of pivot support points selected is arbitrarily established.

It should be noted that point A represents the pivot point about which the rectangle 82 will rotate as rotation is commenced. This is the reason that point A is designated the initial pivotation center. With continued rotation, the frame 12 will be pivoted to a new position, with respect to the reference position thereof, and this new position has been depicted by the rectangle 82'. Correspondingly, points on the reference circle 84 shift to new positions corresponding to a circle (not shown) which could be drawn on the rectangle 82' and bearing with respect to the rectangle 82' the same geometric relationship that the reference circle bears to the rectangle 82. It will be shown hereinbelow by a discussion of FIG. 6A that a point located at the point A on the reference circle 84 will move along the major chord or diameter of the reference circle 84 to a new point designated AA in FIG. 5.

In summary, an initial axis of pivotation for the rectangle 82 is first selected, and the reference circle 84 is selected such that a portion or portions of the circumference of the reference circle coincides with points within the rectangle 82, or in the case of the frame 12, these are points on the circumference of the reference circle that are coincident with points on the transverse cross members 20 and 22. Next, support points are selected from the set of points defined as having commonality of: being a usable support point for the rectangle 82 based upon structural considerations; and, being on the circumference of the reference circle 84. This position of the selected points, established as described, may be referred to as the reference mode of the support points.

For each of the pivot support points, which are points 24, 26, 28 and 30 for the discussion herein, a line is drawn between each pivot support point and a point B, hereinafter sometimes referred to as a travel axis convergence point. In FIG. 5, these lines are designated 86, 88, 90 and 92, and represent chords of the circle 84, respectively connecting: Points 24 and B; points 26 and B, points 28 and B; and points 30 and B. The reference point B is defined as being the circumference point that is on the end of a diameter 94 or major chord of the reference circle 84, the diameter 94 including the initial pivot point A at its opposite end. To distinguish this particular diameter of the reference circle 84, it will sometimes hereinafter be referred to as the reference diameter 94.

Each of the lines 86, 88, 90 and 92 is an axis of travel and passes through one of the pivot support points and through the common travel axis convergence point B. As will become clear below, the pivoting connectors 14 are supported so that each such pivoting connector 14 is movable along its respective axis of travel. Of course, due to the three dimensional character of an embodiment of the present invention, a connector 14 will not physically occupy the path of its axis of travel. Therefore, the movement of each of the connectors 14 will be characterized as moving along its respective axis of travel, and this will mean that the actual path of travel of a connector 14 will parallel its respective axis of travel.

Once the above geometric relationship has been accomplished, the bearing posts 16 are fixedly established in spaced apart relationship so that the longitudinal axis of each bearing post is parallel to one of the axes of travel 86, 88, 90 or 92. The pivoting connectors 14, connected to the bearing posts 16 as above described for FIG. 3, serve to establish the spatial location of the bearing posts 16 relative to the frame 12.

The bearing posts 16 are then established relative to the support platform 78 by providing the bearing blocks 60 that are connected to the bearing posts 16, as above described for FIG. 4, to slidingly hold the bearing posts 16 while permitting each bearing post 16 to reciprocate along its respective longitudinal axis. In this arrangement, the longitudinal axis of each bearing post 16 serves as an axis of support for its respective connector 14 to travel along its respective axis of travel as described above.

While four such bearing posts 16 have been shown for purposes of illustration herein, any other number of such bearing posts could be utilized as support surfaces, so long as all the support points are on the circumference of the reference circle 84 when the rectangle 82 (or frame 12) is in the nonpivoted reference position as depicted in FIG. 5, and the bearing posts are coincident with or parallel with the axes of travel as previously described. This position can also be considered the normal or null position of the rectangle 82, or for that matter, of the frame 12, since the rectangle 82 is merely a block diagram depiction of a frame such as frame 12.

With the rotation of the rectangle 82 in the plane of the drawing of FIG. 5, the pivoting connectors 14 assume different positions as indicated by the numerals 14' and the pivot support points marked 24', 26', 28', and 30', as the bearing posts 16 slide along their respective longitudinal axes. For purposes of illustration, the bearing posts 16 are unrestricted in their travel as shown in FIG. 5. It will be apparent that the total permissible amount of rotation of the frame 12 will be determined by the physical layout of the components, such as the spacing of the bearing blocks 60.

For clarity purposes, it is once more noted that the reference circle 84, the initial pivot point A, the travel axis convergence point B and the selected pivot support points 24, 26, 28 and 30, have been established as shown for illustrating the principle of the present invention. In an actual application, there is an almost indefinite choice of design criteria available, the selection of which would ultimately be determined by many factors including structural considerations. The principles of the present invention would require that the geometric relationship as described above be established for the selected pivot support points and that the connectors be supported for movement along the axes of travel as described and defined above.

As the bearing posts 16 are positioned relative to the frame 12, each would be positioned following the guidelines in the above discussion. It is not necessary that all such bearing posts 16 be placed an equal distance from the frame 12, as it is possible, if desired, to have spatially staggered bearing posts.

It will be apparent that an axis of travel corresponding to the reference diameter 94 could be selected for placement of a bearing post relative thereto if an appropriately sized circle is selected, as would be the case if the initial axis of pivotation and the size of the reference circle were determined such that point A was within the area of the rectangle 82 in FIG. 5. Under these conditions, the point A would qualify as a pivot support point to be used in the same manner as above described for the pivot support points 24, 26, 28 and 30.

Another special case is that wherein an axis of travel line is drawn tangential to the reference circle 84 and passing through the travel axis convergence point B. Of course, to qualify as a pivot support point, the size of the reference circle 84 would need be established so as to place point B within the rectangle 82. In this case, the axis of travel would qualify as a reference line for selection to position a bearing post relative thereto, and the point B would be included within the set of points on the circumference of the reference circle 84 as defined in the description of the preferred embodiment.

The linear support apparatus 10 has been described as an embodiment of the present invention, and the discussion with reference to FIGS. 1 through 5 is believed adequate for the practice of the present invention by persons having ordinary skill in the art. To the end that the principle of the present invention may be even more fully understood, a mathematical discussion of the geometrical relationship required of the physical components will now be provided.

The diagram of FIG. 6A depicts the reference circle 84, the great diameter 94, and the line or chord 88, all of which were discussed above with reference to FIG. 5. In FIG. 6A, point $A_1$ represents the travel axis convergence point, point $B_1$ represents a support point on the circumference of the reference circle 84, and point $C_1$ represents the initial axis of pivotation. It follows then that the triangle $A_1B_1C_1$ is a right triangle, the corners of which lay on the circle 84. For purposes of the present proof, the point depicted as point $A_1$ is restrained to move tangentially to a point depicted as point $A_2$, and the point depicted as point $B_1$ is restrained to move along the line or chord 88 to the point depicted as point $B_2$. The triangle $A_2B_2C_2$, shown in broken lines, is the new position of the triangle $A_1B_1C_1$ which is moved within these restraints of points $A_1$ and $B_1$. With these considerations, the proof offered will establish that the path of the point $C_1$ will be along the diameter 94 as the triangle $A_1B_1C_1$ moves to $A_2B_2C_2$.

If the point $C_1$ moves along the diameter $A_1C_1$, then the value of X as shown in FIG. 6A will be zero for any movement of the triangle $A_1B_1C_1$ within the given restraints, with X representing the displacement of the point $C_1$ from the diameter 94.

In FIG. 6A, $d$ represents the amount of displacement of $A_1$ to $A_2$, and it follows that:

$$X = d - A_1C_1 \sin \theta \qquad (1)$$

where $A_1C_1$ is the length of the line between $A_1$ and $C_1$, or diameter 94, and $\theta$ is the angle through which the diameter 94 is moved to its new position represented by the line 94'. By the law of sines:

$$\frac{d}{A_1B_1} = \frac{\sin \theta}{\sin(90 - \phi)} = \frac{\sin \theta}{\cos \phi} \qquad (2)$$

Also, since $A_1B_1C_1$ is a right triangle, it follows that:

$$A_1B_1/A_1C_1 = \cos \theta, \text{ and} \qquad (3)$$

$$A_1C_1 = A_1B_1/\cos \phi \qquad (4)$$

Making the proper substitutions for these known equivalents, equation (1) now yields:

$$X = A_1B_1\left(\frac{\sin \theta}{\cos \phi}\right) - \frac{A_1B_1}{\cos \phi}(\sin \theta), \qquad (5)$$

which equates to $X = 0$ for the general case regardless of the value of $d$ within the given restraints.

While the above proof is considered sufficient for the purposes of the present disclosure, a more rigorous mathematical proof of the principle of the present invention may be accomplished in the following manner. The diagram of FIG. 6B depicts the diameter D of the reference circle 84 in its reference mode and displaced to a new position depicted by the broken line D' under the same movement restraints as defined in the discussion of FIG. 6A. That is, the point $P_1$, representing the travel axis convergence point, is displaced tangentially; the point $P_2$, representing a support point on the reference circle 84, is displaced along the chord on line C a distance $e$; and the point $P_3$, representing the point on the reference circle that is initially coincident with the initial pivotation center, is displaced along the diameter D a distance $f$. Defining the angle $\phi$ as the angle $P_4P_1P_2$, the principle of the present invention is proved for the movement of any selected point on the reference circle if for a general point $P_2$, it can be shown that:

$$\text{Arc tan } (ey/ex) = \phi \qquad (6)$$

with $d$, the displacement of $P_1$, not restricted to small motion, and where $ex$ and $ey$ are the displacements of $P_2$ in the $x$ and $y$ coordinates respectively.

By definition:

$$\theta = \text{Arc sin } d/D \qquad (7)$$

where $\theta$ is the angle of displacement of the diameter $D$, and since D' equals D.

Where $f$ represents the displacement of the point $P_3$ along the diameter D (as shown above in FIG. 6A), it follows:

$$f = D - D \cos \theta \text{ and} \qquad (8)$$

$$A = D \cos \phi \qquad (9)$$

where $A$, the chord between $P_2$ and $P_3$, is one leg of the triangle $P_1P_2P_3$. From FIG. 6B, the following equations define $e_y$ and $e_x$:

$$e_y = A \cos \phi - f - A \cos(\phi + \theta) \qquad (10)$$

$$= D \cos^2\phi - D + D \cos \theta - D \cos \phi \cos(\phi + \theta) \qquad (11)$$

$$e_x = A \sin (\phi + \theta) - A \sin \phi \qquad (12)$$

$$= D \cos \phi \sin (\phi + \theta) - D \sin \phi \cos \phi \qquad (13)$$

Because $$\cos^2\phi = 1 - \sin^2\phi \quad (14)$$

and $$\cos(\phi + \theta) = \cos\phi\cos\theta - \sin\phi\sin\theta \quad (15),$$

it follows that:

$$e_y = D[1 - \sin^2\phi - 1 + \cos\theta - \cos^2\phi\cos\theta + \cos\phi\sin\phi\sin\theta] \quad (16)$$

$$e_y = D\sin\phi[\sin\phi\cos\theta - \sin\phi + \cos\phi\sin\theta] \quad (17)$$

Because $$\sin(\phi + \theta) = \sin\phi\cos\theta + \cos\phi\sin\theta \quad (18),$$

it follows that:

$$e_x = D[\cos\phi\sin\phi\cos\theta + \cos^2\phi\sin\theta - \sin\phi\cos\phi] \quad (19)$$

$$e_x = D\cos\phi[\sin\phi\cos\theta - \sin\phi + \cos\phi\sin\theta] \quad (20)$$

Therefore, it also follows that:

$$\text{Arc tan}(e_y/e_x) = \text{Arc tan}(\sin\phi/\cos\phi) = \text{Arc tan}(\tan\phi) \quad (21)$$

The proof is now completed since it directly follows from this last equation that:

$$\text{Arc tan}(e_y/e_x) = \phi \quad (22)$$

The interpretation of the above proof in terms of an embodiment of the present invention is that a pivot support point located at point $P_2$, and consequently at any other such point on the reference circle, will be caused to move along an axis of travel which is the chord (or an extension of the chord) passing through the pivot support point and the travel axis convergence point, the latter point being $P_1$ in FIG. 6B.

OPERATION OF THE PREFERRED EMBODIMENT

Referring to FIG. 2, the frame 12, as described above, is supported by its connections to the pivoting connectors 14 for rotational movement relative to an axis of pivotation that is perpendicular to the drawing. This is illustrated by FIG. 5 wherein the rectangle 82, which represents the frame 12, is rotatable about an axis of pivotation perpendicular to the drawing through the point A, which is the initial pivotation center for the frame 82. It is noted that the instantaneous axis of pivotation of the frame 12 moves as the frame 12 moves. In particular, it can be shown that a point diametrically opposed to the travel axis convergence point on a circle drawn on the frame 12 and coinciding with the reference circle when the frame 12 is in the reference position thereof is the instantaneous axis of pivotation of the frame 12 for any position thereof.

It will be apparent that means will normally be provided to effect the rotation of the frame 12 in actual use of the present invention. To this end, the apparatus of the present invention will often be combined with automatic detecting means, feedback means and other apparatus designed to effect controlled mechanized rotation. A conventional linear acting hydraulic ram or air cylinder can be utilized to apply a rotating force to the frame 12 at any number of positions along the frame 12. The importance of this is that linear positioning and control means can be used with the present invention for controlled rotation of a frame supported by the linear support apparatus of the present invention.

As the frame 12 is caused to rotate, it pivots upon the selected support points 24, 26, 28 and 30. This is accomplished by the change of the relative angular positions of the cross members 20 and 22 to their respective pivoting connectors 14 via the linkages of the respective bushings 54 and connectors 56 as shown in FIG. 3. Simultaneously with the pivotation of the cross members 20 and 22 to the pivoting connectors 14, the bearing posts 16 slide in the bearing blocks 60 in the manner depicted by the numerals 14' in FIG. 5, representing this movement. Movement of the frame 12 in the opposite rotational direction can be effected by causing the moving force to so direct. In other words, the frame 12 smoothly moves in either rotational direction from its reference or null position (depicted in FIG. 2) on the linear bearing surfaces provided.

While the present invention has been illustrated by the linear support apparatus 10 and its frame 12, it is clear that the present invention is not limited to the type of frame that is attached to the linear bearing surfaces. In fact, frames are often more square than that of the frame 12; that is, the end members 18 are very often more equal to, or greater than, the length of the cross members 20, 22, that are shown in FIG. 2. In such cases, support of the frame has presented structural problems where heretofore known supporting and pivoting means have been employed. The reason for this is that support bearings must be placed relatively close to the corners of the frame, or alternatively, large structural members must be used to withstand large leverage forces supported by the bearings. Sometimes, undirectional planar bearing surfaces have been utilized, which are adequate in some positions of the frame, but require special design considerations if the frame is suspended in a position wherein the gravitational field causes the weight to be non-uniformly distributed on conventional bearing surfaces.

As an example of this, if a frame is adequately supported by conventional bearing surfaces in one loading profile, the frame may not be adequately supported if the loading profile is changed, such as would occur if the frame must be inverted or suspended vertically.

The present invention provides the only means now known for pivotally supporting a frame, in the manner described above, wherein multiple antifriction bearings may be used, and wherein such bearings are disposable in a wide range of selectable positions. This permits the loading profile to be varied in an almost unlimited way, and further permits the use of a frame to be positioned in any selected orientation in the earth's gravitational field without adversely affecting the weight distribution on the linear bearing surfaces.

It will be apparent from the foregoing, to those skilled in the art, that the apparatus described in detail above provides an improved linear support apparatus. The apparatus uses multiple linear bearing surfaces, and it is comprised of components that require a minimum in manufacturing cost and upkeep. And, the linear support apparatus may be disposed so as to rotate in any selected plane of pivotation.